May 15, 1956     W. J. HAYNES     2,745,675
BASKET CARRYING CART
Filed July 21, 1953
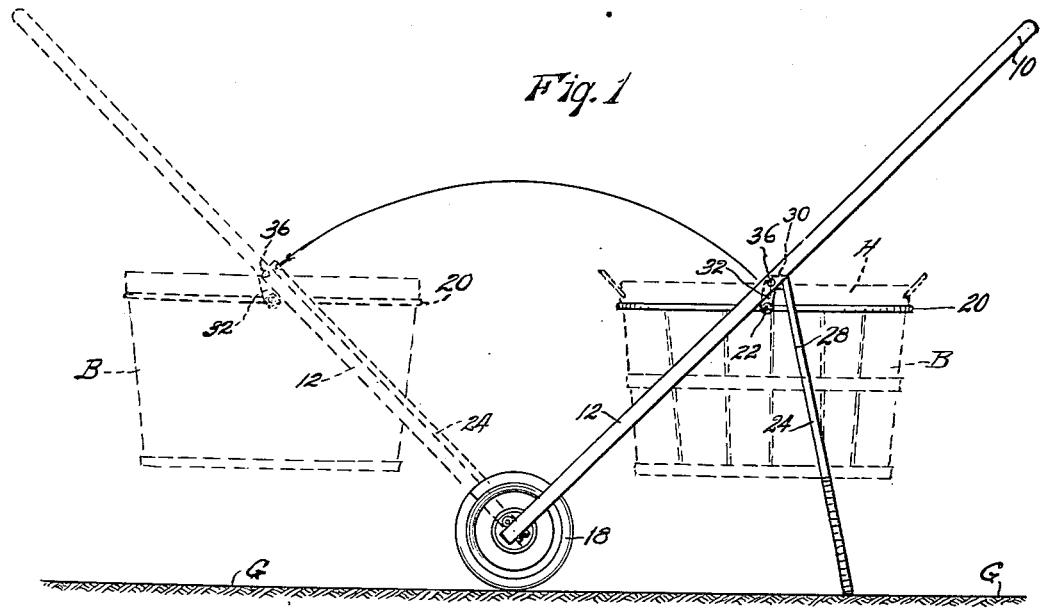

United States Patent Office 2,745,675
Patented May 15, 1956

2,745,675
BASKET CARRYING CART

William J. Haynes, Bonner Springs, Kans., assignor to Leavenworth Steel, Inc., Kansas City, Kans., a corporation of Kansas Application July 21, 1953, Serial No. 369,280

1 Claim. (Cl. 280—47.24)

This invention relates to improvements in a basket carrying cart having means wherein is oscillatably mounted a standard bushel basket to receive a load to be transported.

The principal object of the present invention is the provision of a basket carrying cart having a wheeled frame having spaced apart side arms, a stand vertically disposed side portions each pivoted at its upper end to one of said side arms, a depending leg extending from the pivotal point of said side portions to receive axially aligned pivot pins, a basket ring pivoted diametrically to said pivot pins for limited oscillatory movement, said leg being so angled to said stand as to secure it in supporting or non-supporting positions. Other objects are sturdiness and economy of construction, ease and efficiency of operation and adaptability for many uses about the home and farm.

With these objects in view as well as other objects which will appear during the course of the specification, reference will be had to the drawings wherein:

Fig. 1 is a side view of the cart with a bushel basket shown in position therein, and with the frame handle reversed to move the long leg to the folded position on the frame member.

Fig. 2 is a plan view of the parts shown in solid lines in Fig. 1.

Fig. 3 is an enlarged view of the parts connecting the basket ring to the cart frame.

Fig. 4 is a view similar to that shown in Fig. 3 with the frame shown in the reversed position shown in dotted lines in Fig. 1.

Fig. 5 is a sectional view taken on line V—V of Fig. 3.

Throughout the several views of the drawings like reference characters refer to similar parts, and the numeral 10 designates a U-shaped frame having spaced apart side arms 12 connected at their inner ends by means of a hand bar 14. The open ends of frame 10 are joined together by means of an axle member 16 on which is rotatably mounted a pair of spaced apart wheels 18. It will be noted that these wheels are mounted on axle 16 intermediate side arms 12. When only light loads are to be carried, the wheels may be placed on the outside of arms 12.

To clearly understand the operation of this cart, it will be noted that the basket receiving ring 20 is pivoted at its diametrically opposite sides to the two depending legs 32, by bolts 22 to normally support the ring 20 in a substantially horizontal plane parallel with the ground surface. The substantially horizontal ring 20 is of an inside diameter suitable to receive a standard bushel basket B therein with its upper hoop H resting on said ring to support the basket load in a balanced position.

A stand 24 of substantially U-shaped has a substantially straight horizontal lower section 26 to rest on the ground and upwardly extending side arms 28 terminating in rebent connecting head member 30, each having depending leg 32 disposed in offset relation to the adjacent side arm 28, and extending outwardly and downwardly therefrom to receive bolts 22 for supporting the basket ring 20.

Reference is now had to Fig. 3 and Fig. 4 wherein these enlarged views are drawn in relative relation to a common vertical structural line A—A.

Referring specifically to Fig. 3, it will be noted that the parts shown are with the cart in the standing position as shown in solid lines in Fig. 1, with the center of gravity line of the basket to the left of vertical line A—A which would cause the stand arms 28 to move outwardly as shown to rest on the ground G to support the basket above the ground.

As shown in Fig. 4 the frame 10 has been moved to the position shown in dotted lines in Fig. 1 with leg 32 disposed to the right of line A—A and with side arms 28 resting on top of side arms 12 of the frame so that the height of the basket load will always tend to pull arm 28 tightly against arm 12. It will be noted that the upper ends of arms 28 are angled off at 34 to contact arms 12 and serves to limit its downward rocking movement. See Figs. 3 and 5. The upper end of leg 32 is pivoted to arm 28 by bolts 36. Basket B as mounted is always free to rock between arms 12 to free adjustment of the basket to its various positions. When the basket is in the position shown in dotted lines in Fig. 1, it may be lowered to the ground or it may be removed and the frame can be hung by the handle on a side wall. This cart has many obvious uses and is very useful about the home and farm.

What I claim as new and desire to secure by Letters Patent is:

A basket-carrying cart comprising a generally planar frame having parallel side arms, ground-engaging wheels mounted at the lower end of said frame, and a handle member at the upper end of said frame, a generally planar stand having spaced apart parallel side portions pivoted respectively at their upper ends to the side arms of said frame on a horizontal axis lying in the plane of said frame, said stand being movable from an inner or folded position lying against said frame to an outer or extended position at an angle to said frame, and stop means limiting the outward movement of said stand, the lengths of said frame and stand being so proportioned that when said cart is at rest with said wheels and said stand in its extended position engaging the ground, the planes of said stand and the lower portion of said frame will be disposed respectively at opposite sides of a vertical plane passing through said pivotal axis, the angle of said frame to the vertical, hereinafter denoted the frame angle, being greater than the angle of said stand to the vertical, the latter being hereinafter denoted the stand angle; a leg fixed to each side portion of said stand and extending downwardly from the pivotal axis thereof at an angle to the plane of the stand, a pair of pivot pins carried respectively by said legs at the lower ends thereof on a common horizontal axis parallel to the pivotal axis of said stand; and a basket-carrying hoop normally disposed horizontally and mounted at diametrically opposite points on said pivot pins, a plane including the axis of said pivot pins and the pivotal axis of said stand being disposed at an angle to the plane of said stand greater than said stand angle, but less than said frame angle.

References Cited in the file of this patent
UNITED STATES PATENTS

| | | |
|---|---|---|
| 1,814,342 | Smith | July 14, 1931 |
| 2,220,150 | Goldman | Nov. 5, 1940 |
| 2,398,863 | Sides | Apr. 23, 1946 |
| 2,670,216 | Leonard | Feb. 23, 1954 |

FOREIGN PATENTS

| | | |
|---|---|---|
| 455,613 | Great Britain | Oct. 23, 1936 |